2,994,660
WATER-IN-OIL EMULSION DRILLING FLUID

William A. Reddie and Robert N. Griffin, Houston, Tex., assignors to Magnet Cove Barium Corporation, Houston, Texas, a corporation
No Drawing. Filed May 27, 1957, Ser. No. 661,615
26 Claims. (Cl. 252—8.5)

This invention relates to water-in-oil (invert) type emulsion well fluids useful in various well operations including the drilling, completing or working over of wells. In one of its aspects, it relates to compositions and methods wherein invert emulsion well fluids have certain properties thereof controlled by using a polybasic fatty acid polymer, preferably in combination with a polyamine or a polyamino alcohol. In another aspect it relates to compositions and methods for forming invert emulsions having very high tolerance towards clay solids and other contaminants.

Invert emulsion systems have been developed for use in oil well operations and the advantages derived from their use are well known; see, for example, Lummus 2,661,334. In providing any commercially suitable invert emulsion system, there are several objectives which desirably should be attained. Some of these objectives are:

(1) Emulsion stability in presence of contaminants: The invert emulsion should remain stable upon contamination with substances commonly encountered in well operations, such as cement, salt, anhydrite, clay particles and the like. Many heretofore known invert emulsions have been sensitive to at least one or more contaminants and have exhibited a tendency to "flip" to the oil-in-water type of emulsion or to degrade in desirable properties, such as fluid loss or viscosity.

(2) Compatibility with conventional drilling muds: The invert emulsion system is preferably basic in nature so that it is compatible with basic (e.g. lime base) muds. In this connection, it should also contain or be compatible with certain ingredients which suppress the yield of high yield clays such as bentonite or bentonitic shales.

(3) Temperature stability: The invert emulsion should be stable under commonly encountered conditions of bottom hole temperature and pressure. Some invert emulsions are stable at room temperature but when subjected to heating, their properties either seriously deteriorate or they "flip" to the oil-in-water type.

(4) Weight suspending ability: The invert emulsion should be capable of being weighted to an appreciable density, such as one within the range of 8 to 20 pounds per gallon or higher, with commonly used weight materials. It should not only be able to hold the weight material in suspension under ordinary conditions while standing quiescent for considerable periods of time, but also to do so at the elevated temperatures frequently encountered in well operations.

(5) Rheological properties: The invert emulsion should have viscosity and gel strength characteristics suitable for its intended use and controllable by addition of oil or water or by simple chemical treatment. These characteristics not only at least partially determine weight suspending ability but also the ability to efficiently remove cuttings from the hole.

(6) Fluid loss: It should exhibit a very low fluid loss (preferably under one cc.) even when contaminated and upon being heated to an elevated temperature.

(7) Economical to prepare and maintain: Any invert emulsion which is too expensive either to prepare or to maintain cannot find acceptance no matter how outstanding its physical properties.

The invert emulsions systems heretofore available either have fallen short of meeting the desired objectives therefor or have generated special problems difficult of solution. In short, they have not achieved the greatest degree of utility while at the same time presenting the least number of problems. It is therefore a general object of this invention to provide an invert emulsion well fluid which, in many important respects, is of improved utility, presents the least number of problems and, which to a large degree, achieves the above objectives for a commercially satisfactory invert emulsion well fluid.

Another general object is to provide an invert emulsion well fluid which has the greatest possible versatility including permitting changes in its properties by chemical treatment as well as by the simpler method of varying the concentrations of its major components, such as oil and water.

Another general object is to provide an invert emulsion which maintains desired properties over a broad range of contamination by drilled or other solids and particularly by those of the highly hydratable type and which even in the presence of high concentrations of drilled solids, shows little tendency to "flip" to the oil-in-water type emulsion.

Another general object is to provide an invert emulsion well fluid having an improved stability toward ordinary contaminants including contamination by cement, salt water, lime base muds, anhydrite, etc., as well as one which remains stable during prolonged exposure to at least moderately elevated temperatures.

Another object of the invention is to provide an invert emulsion well fluid having an appreciable gel strength and viscosity and also to provide a method and material for controlling the gel strength and viscosity of an invert emulsion well fluid.

Another object of the invention is to provide an invert emulsion well fluid which can be weighted with ordinary weight material to high weights and yet the weighting material will remain suspended in the emulsion under a wide range of well conditions without any appreciable settling or adverse effect upon the other properties of the emulsion.

Another object of the invention is to provide an emulsion well fluid which exhibits a desirably low fluid loss as well as desired viscosity and gel characteristics even in the absence of insoluble solids in the emulsion.

Another object of the invention is to provide an invert emulsion fluid which employs an ionic type surface active agent and yet which is stable even in the presence of high concentrations of soluble ionizable inorganic salts.

Other objects, advantages and features of this invention will be apparent to one skilled in the art upon a consideration of the written specification and the claims.

It has now been found that an invert emulsion well fluid having desired properties can be formed or stabilized by using polybasic fatty acid polymers, preferably in a soap form, and a selected polyamine or a polyamino alcohol, or mixtures thereof, as co-emulsifiers. The resulting emulsion is remarkably stable and exhibits excellent rheological properties and fluid loss properties even in the absence of undissolved solids, conventional fluid loss or rheological control agents, and the like, in the emulsion. Further, it has been found that the rheological properties of such an emulsion can be controlled by the addition of certain ones of the diamino alcohols or derivatives thereof.

Thus, for example, an invert emulsion well fluid of 50 parts by volume of water, either fresh or containing salt (NaCl) up to saturation, and 50 parts by volume of diesel oil can be prepared by the use of 15 pounds per barrel of vegetable pitch. The invert emulsion so formed may not be as stable as desired and its fluid loss, in the absence of solids, is sometimes higher than desired.

Nevertheless, the vegetable pitch per se (and the other polymers herein disclosed), and in the absence of additives with which it can react to form a soap, acts as an emulsifier to form an invert emulsion which may be suitable for use in many instances. Its suitability is particularly enhanced by adding clay solids or the like whereby the fluid loss is decreased. To further improve such invert emulsion, compounds capable of reacting with the vegetable pitch can either be added for reaction with the pitch in situ in the emulsion or less preferably, pre-reacted with the pitch before the emulsion is formed. For example, the emulsion can be further stabilized by the addition of 3 pounds per barrel of sodium hydroxide and 10 pounds per barrel of calcium chloride. While the invert emulsion thus formed can be used as a well fluid, its fluid loss tends to be higher than is desired in many cases and its stability tends to be lowered by contamination with sodium chloride.

It has been found that the above base or primary emulsion can be further stabilized and have its over-all characteristics improved by the addition thereto of say, for example, one pound per barrel of certain pre-selected polyamines or polyamino alcohols such as N,N,N',N'-tetrakis (2-hydroxypropyl) ethylenediamine or, more preferably, N,N,N',N'-monohydroxyethyltrihydroxypropyl ethylenediamine (MTE). The addition of such a compound not only aids in developing a low fluid loss emulsion even in the absence of undissolved solids in the emulsion, but also aids in rendering it more stable, in increasing its weight suspending ability and, in general, in improving its over-all characteristics. The resulting emulsion can have its viscosity and gel strength controlled by the addition of oil to decrease these values or by the addition of water to increase them. However, the viscosity, and particularly the gel strength, is controllable by the addition of certain ones of the amino alcohols, or certain derivatives thereof.

The ingredients of the emulsion of well fluid may be added in any order and an operable composition will result. One simple way of preparing the emulsion is to add the co-emulsifiers and other ingredients to the oil and after admixing therewith, adding the desired amount of water, followed by adequate mixing. It has been noted that the emulsion properties improve as the mixing progresses until a plateau is reached. Moreover, the properties frequently improve with aging, as for example, for 24 hours. Weighting material can be added as desired and preferably is added after the emulsion is formed. However, it should be noted that it is not necessary to add any solids in order to achieve desirable fluid loss and other properties of the fluid, these being realized through the use of fluid or soluble ingredients in the emulsion.

If desired, the emulsion stabilizing agents can be compounded as a dry free-flowing concentrate. Exemplary of such a formulation is one of the following composition:

| Ingredient: | Parts by weight |
|---|---|
| Vegetable pitch 250 | 15 |
| MTE [1] | 1 |
| Caustic (NaOH) | 3 |
| Calcium chloride | 10 |
| Perlite | 6 |
| Adsorptive clay (X-811) | 15 |
| | 50 |

[1] Monohydroxyethyltrihydroxypropylethylenediamine.

In formulating the dry mix, it is usually found preferable to heat together the co-emulsifiers, e.g. vegetable pitch and MTE, until they become fluid and then smear them on the perlite in suitable mixing apparatus. As soon as the mixture has become more or less homogeneous, the other ingredients can be added. The exact order of mixing of the ingredients to form the dry concentrate does not seem to be important; however, best results are obtained when the vegetable pitch is separately added to the perlite to be selectively adsorbed thereon. The reason for this is that the vegetable pitch seems to be more easily dissolved by the oil phase of the emulsion from the perlite than from the adsorptive clay.

Although specific materials and concentrations are referred to above, it has been found that some latitude is possible with respect thereto and with respect to omitting certain of the materials. This will be discussed in greater detail below as will be certain other features of the invention. Further, while it is preferred to combine the ingredients of the formula as a dry free-flowing concentrate, they can be added separately to the oil and water phases to produce a water-in-oil emulsion having desired properties.

In order to demonstrate the invention more fully, a detailed description thereof appears below wherein the more important features are separately discussed.

WATER PHASE

The water used in preparing the emulsion of this invention can be of almost any type found in the vicinity of existing oil fields. It may be fresh water containing relatively minor amounts of dissolved salts such as are found in the various water supplies of cities. It can contain varying amounts of salt (sodium chloride) and suitable emulsions are formed even with saturated salt water. In fact, the emulsion's properties are frequently enhanced by adding sufficient salt to saturate the aqueous phase. The water can also contain such contaminants as substantial amounts of gyp, oil field brines, or it can even be sea water. The water phase can also be added as a water base mud thus permitting conversion of existing water base muds to the invert emulsion type. In general then, the emulsion of this invention can be compounded from any naturally occurring water.

It should also be pointed out that the basic character of the fluids of this invention plus their tolerance to various ingredients found in ordinary well fluids permits the invert emulsion fluid to be either compounded from conventional muds, such as lime base muds, which provide the aqueous phase, or to be contaminated with such during conversion from a water base to an invert emulsion system. In this connection, it should be noted that certain waters and water base muds may already contain certain ingredients (e.g. lime, calcium salts, caustic, etc.) which play an active part in this invention. The specification and claims contemplate the addition of such ingredients in this manner.

The amount of water used in preparing the emulsion well fluid can vary over a wide range. Thus while it is preferred that the water content be within the range about 20 to about 65 volume percent of the combined oil-water phases, it can be varied outside this range as from about 10 to about 75 volume percent. However, as the water concentration approaches the upper limit of this range, the emulsions tend to become less stable and more prone to "flip" to the oil-in-water type. Also the emulsions tend to become somewhat viscous and more susceptible to deterioration of their properties by water contamination. Further, there may be loss of the oil as a filtrate which would further increase the relative water concentration and for these and other reasons, an upper water phase limit of 75 volume percent should not be exceeded for practical operation. In many operations, an upper limit of about 60 volume percent of water will be found to be the practical value.

As the water concentration approaches the lower limit of the above-specified broad range, the viscosity and gel strength of the emulsion may decrease so that it may become necessary to add certain viscosity and gel increasing agents, described below, in order to maintain the emulsion with the desired rheological properties. Also, since oil is usually more expensive than water and since additional concentrations of stabilizing agent are frequently required with higher water concentrations, economic considerations usually dictate the lower-water concentration. However, it should be pointed out that the compositions of this invention can be added to oil base fluids to render them more stable toward water contamination. Thus, water contamination of the oil base mud merely causes it to be converted to an invert emulsion mud.

The degree of weighting of the invert fluid will in part determine the particular water concentration to be used. As increased amounts of weighting material are added, the water concentration should be decreased to avoid excessive thickening of the fluid. Conversely, unweighted or light weight muds can have a higher water content in order to provide adequate viscosity.

OIL PHASE

Either refined or crude oils can be used for compounding the emulsions of this invention. However, it is usually preferable to use a refined oil such as diesel oil or fuel oil since they are relatively heavy oils without light ends and are free from unknown emulsifiers which are often found in crude oils. Since the desired properties of an oil (e.g. flash point, etc.) which is to be used as a part of a well fluid are well known to those skilled in the art, further description thereof is not believed necessary.

Instead of oil, other hydrophobic inert fluids can be used, either to completely or to partially replace the oil. For example, heavy liquids, such as chlorinated hydrocarbons (e.g. tetrachloroethylene) can be used in place of the oil to make a high density well fluid without having to use any undissolved solids such as barite. Salts, such as NaCl or $ZnCl_2$, can also be dissolved in the water phase to increase the weight of the emulsion. Such a well fluid finds use as a perforating fluid, etc. If desired, water can be omitted from such a well fluid so that, as in the case of the oil base mud mentioned above, the well fluid comprises the hydrophobic liquid, the soap and the amino alcohol with or without any added base or salts.

The volume of oil to be used has already been indicated indirectly in the discussion of the water phase. The oil is simply employed in an amount necessary to make the difference between the volume percent of water employed and 100 percent It is to be noted that oil can be added as desired to thin the mud if required as, for example, it may be when the weight of the mud is increased.

POLYBASIC FATTY ACID POLYMER

This ingredient, in a preferred embodiment, exists in the emulsion in the form of an oil-soluble soap where it acts as a co-emulsifier with one or more of the polyamines or polyamino alcohols. However, this material per se (not in a soap form) can in and of itself stabilize a water-in-oil emulsion. While the emulsion properties are not such as may be required in many instances, nevertheless the invert emulsion consisting of oil-water and polymeric material can be used where well conditions are mild. Also, a limited amount (1 to 15 pounds per barrel) of clay (particularly bentonite) or weighting material will usually benefit such an emulsion by decreasing its fluid loss and increasing its viscosity. However, it is preferred that the polymeric fatty acids be converted to an oil-soluble or oil-dispersible form, either prior to addition to the well fluid or in situ therein. Such an invert emulsion, formed from only water, oil and the soap, exhibits reasonably high stability, medium viscosity, relatively low gels and comparatively high fluid losses when the water phase is fresh water. However, when the water phase is saturated salt water, the stability decreases considerably and the other properties remain substantially the same except for a slight decrease in viscosity and fluid loss. The emulsions are all smooth and have a good appearance even with the saturated salt water phase. This is true even though the alkali metal (e.g. sodium) soaps are used. This result is rather unexpected because it has been heretofore taught that various fatty acid emulsifiers, particularly the alkali metal soaps thereof, are rendered ineffective by the presence of substantial quantities of electrolyte. For that reason, the prior art has thought in terms of non-ionic emulsifiers for use in electrolyte containing invert emulsions. In this case, however, the efficiency of the polymerized fatty acid material (e.g. vegetable pitch) may be explained by the fact that it is not merely a fatty acid emulsifier but rather is a polymerized material derived from fatty acid sources.

Thus the fatty acid material can be described as a polybasic fatty acid polymer resulting from the polymerization, as by heat treatment, of unsaturated fatty acids which have from 12 to 24 carbon atoms per molecule, the resulting polybasic fatty acid polymer comprising predominantly (over 30%) either or both the dimers and trimers which have a carbon atom content per molecule in the respective ranges of 24 to 48 and 36 to 72 and which are respectively di- and tri-basic. Mixtures of the dimers and trimers can be used and this mixture will have polymers with a carbon atom per molecule content of 24 to 72.

Examples of unsaturated fatty acids which can be polymerized to provide the polymer are linoleic, oleic, erucic, linolenic, isolinolenic, eleomargaric, eleostearic, etc. and mixtures thereof.

The polymers can be prepared from substantially pure unsaturated fatty acids or from mixtures thereof. The starting material can also comprise various natural vegetable and animal oils and fats which are rich in unsaturated fatty acids such as cottonseed, corn, soyabean, linseed, castor, tung and rape oils as well as pork and other fats which contain such acids. Such type of starting materials also contain various amounts of other ingredients such as saturated fatty acids, sterols, hydrocarbons, alcohols, aldehydes, ketones, etc. but nevertheless, they comprise predominantly (over 30%) unsaturated fatty acids having 12 to 24 carbon atoms per molecule and the other ingredients are present more or less as diluents. Accordingly, when polybasic fatty acid polymers are referred to herein, it will include not only such polymers in relatively pure form but also will refer to a product in which the polymers are in admixture with other ingredients as may be found from or exist in various starting materials from which the fatty acid polymers are made, the polymers constituting at least 30% by weight of such mixture. It will thus be seen that the polybasic fatty acid polymer content of the polymerized material will be dependent somewhat upon the amount of other ingredients in the starting material as well as upon whether or not any of such other ingredients are distilled off during or after the polymerization reaction. In most instances, the polymerized material should contain at least 30% by weight of dimers, trimers and higher. Where the fatty acid polymer content of the fraction containing it is small, larger amounts of such fraction will be used and vice versa.

The polymerized fraction should be substantially free from or contain only low (less than 10%) concentrations of rosin acids such as occur in tall oil.

Thus it will be seen that the object is to use a polybasic fatty acid polymer and since such can be prepared from a variety of starting materials, some of which are quite complex and incapable of exact definition of all their specific components, the term "polybasic fatty acid polymer" will be used to designate both the polymer per se and the material fraction containing it along with diluents, both being as above defined. It will not infer that such product is prepared from a specific starting material unless otherwise stated.

Due primarily to economic reasons, it is preferred to provide the polybasic fatty acid polymer in the form of a vegetable pitch or a linseed pitch (the latter to be distinguished from linseed oil which is an ester and not a polymerized fatty acid).

The vegetable pitches employed in accordance with this invention are commercially available from various sources and are identified in the trade by the term "vegetable pitch," but also might be termed vegetable oil fatty acid pitches. They are tacky, viscous dark brown materials commercially produced from cotton seed, corn and soy bean oils. They may also contain minor amounts of constituents from coconut and peanut oils, and from animal fats and oils, such as tallows and greases. The crude vegetable oil starting material consists mainly of fatty acid triglycerides, with minor amounts of sterols, vitamins, antioxidants, pigments, hydrocarbons, alcohols, and ketones. The crude oils also contain varying amounts of free fatty acids.

In accordance with one process for producing commercial vegetable pitches, the crude vegetable oil material is treated with aqueous caustic to remove the free fatty acids and other non-glyceride material. The thus removed reaction product, called raw soap stock, consists of soap, oil and non-glyceride material. The raw soap stock is treated with sulphuric acid or the like and the soaps are converted to free fatty acids and the product, called acid soap stock, consists of fatty acids, oil and non-glyceride material. The term "oil" is, of course, used to designate the fatty acid triglyceride. In general the composition of vegetable oils and acid soap stock is as follows:

| Material | Percent Fatty Acids | Percent Glycerine (as Glycerides) | Percent Unsaponifiables |
| --- | --- | --- | --- |
| Vegetable Oil | 88-90 | 9-10 | 1-2 |
| Acid Soap Stock | 85-95 | 0.5-2 | 1-3 |

The vegetable oil, or the acid soap stock, or both, is passed through a high pressure continuous splitter. In the splitter, these materials are intimately mixed with water and steam at about 500° F. at about 760 p.s.i. The water reacts with the glycerides to form free fatty acids and glycerine, which are separated. The resulting crude fatty acid fraction contains approximately 2% unsaponifiables, 4% glycerides and 95% free fatty acid. This fraction is then fed to a continuous fractionating still, where approximately 80% of the fraction is distilled overhead as fatty acids while the remainder is continuously removed from the bottom of the still as "still vegetable residue." The distillation is conducted at 2-5 mm. pressure and at a temperature of about 510° F., with a very small percentage of steam being injected into the base of the column. The average time during which the residue is subjected to these conditions is about 4 hours.

As mentioned above, vegetable pitch can be derived from cotton seed, corn and soy bean oils. Each of these oils can separately comprise the crude vegetable oil starting material so as to be separately refined as above described to provide individual "still vegetable residues" or they can be premixed to form a composite crude vegetable oil starting material resulting in a composite residue. Alternatively the individual still vegetable residues can be processed separately as described below or they can be mixed to form the composite residue. In any event, it is the usual practice to use a mixture of the still residues from these three oils as a feed for the pitch-producing process although any one or more of the residues can be fed separately to produce its corresponding pitch.

Various vegetable pitches are produced by further stripping the individual or composite still vegetable residues in a batch still at 2-5 mm. pressure and at about 480° F. for about 8 hours. The stripping is continued, with removal of lighter overhead products, until the pitch or bottoms has the desired specifications. In one instance, vegetable pitch 250 is provided by continuing the distillation until the bottoms has a viscosity of 9-19 seconds at 165° C. in a Zahn G-5 cup. A lighter pitch can be obtained by stopping the stripping while the bottoms has a viscosity of 8.5-10 seconds at 125° C. in a Zahn G-5 cup.

In the usual case, between 20 and 25% of the original still residue is removed as an overhead product of the batch distillation with the remainder or bottoms comprising the vegetable pitch. The sterols, hydrocarbons, alcohols, antioxidants, pigments, aldehydes, ketones, etc. which were originally present in the still vegetable residue remain to a certain extent to appear as a part of the pitch or bottoms product of the batch distillation. A goodly portion of the original percentage of these materials will be degraded or converted to other forms in the various processing steps. Under the conditions of distillation steps, particularly of the batch distillation, the undistilled unsaturated fatty acids remaining from the original vegetable oils are polymerized and some fatty acids will be decarboxylated. Some fatty acid anhydrides and lactones will also be formed.

Thus corn, cotton seed and soy oils contain relatively large proportions of unsaturated fatty acids. When treated by the above process, these acids polymerize, especially during the high temperature distillation and stripping steps.

While the above described process is commercially employed to produce vegetable pitch, other processes can also be employed and this invention is not limited to any particular processing steps. For example, the vegetable oils can be air blown to polymerize or they can be deliberately polymerized by treating the original oils with heat and with or without catalytic action, in manners known to those skilled in the art.

A typical pitch which has been found to be excellent in the practice of this invention has the following composition:

*Vegetable pitch 250*

| | |
| --- | --- |
| Unsaponifiable matter | 15%. |
| Softening point, ball and ring | 55° C. |
| Acid value | 55 (45-65). |
| Saponification value | 130 (120-135). |
| Iodine value | 80 (70-90). |
| Color (Barrett) | 18. |
| Free fatty acids | 27% minimum. |
| Triglycerides, anhydrides and lactones | 40% minimum. |

This particular pitch has a viscosity (Zahn G-5 orifice) within the range of 9-19 seconds at 165° C. It contains about 0.5% of moisture and volatile matter.

Another vegetable pitch, which is obtained in the same general manner as vegetable pitch 250 except the batch distillation step is of shorter duration so that less of the lighter products are distilled from the final pitch. This pitch is less preferable and contains less polymerized acids and more unsaponifiable material and has a typical composition as follows:

*Vegetable pitch 150*

| | |
| --- | --- |
| Unsaponifiable matter | 23%. |
| Softening point, ball and ring | 32° C. |
| Acid value | 45. |
| Saponification value | 125. |
| Iodine value | 95. |
| Color (Barrett) | 16. |
| Free fatty acids | 22% minimum. |
| Triglycerides, anhydrides and lactones | 40% minimum. |

It has viscosity (Zahn G-5 orifice) between 8.5 and 10 seconds at 125° C. Its moisture and volatile components amount to about 0.5%.

Linseed pitch can also be used although it is less preferable than vegetable pitch 250. Linseed pitch can be made from linseed oil by the vegetable pitch process outlined above or it can be mixed with various of the vegetable oils mentioned above and the mixture used as a starting material for the pitch process. Also, vegetable oils other than the corn, cottonseed and soy oils can be made into pitches by the described vegetable pitch process. Mixtures of the vegetable oils can also be used. The important consideration is that the oil starting material be of such nature that the process can produce unsaturated fatty acids (12–24 carbon atom) which in turn can be polymerized to provide a product containing polybasic fatty acid polymers.

As an example of a different process for producing polybasic fatty acid polymers, castor oil can be fused with caustic to liberate sebacic acid soaps, capryl alcohol and ricinoleic and other fatty acid soaps. This mixture, upon acidification, is then resolved to recover the sebacic acid and capryl alcohol and a "by-product acid." The latter is acidified and distilled. The kettle product is redistilled to obtain an overhead comprising about 85% of stearic acid and the residue from this second distillation comprises a mixture of fatty acids containing 40 to 50% of dibasic dimeric fatty acids. So far as this invention is concerned, this residue (VR–1 acid—Rohm and Haas) is very similar to vegetable pitch 250 and will be construed to fall within the term "vegetable pitch." For a further description of its preparation, see U.S. Patent 2,267,269 which refers to it as a residue non-volatile at 270° C. and 4 mm. pressure.

Although usually more expensive, purified polymerized fatty acids can also be used. These acids are deliberately polymerized and then purified to yield a product low in monomer and having present various proportions of the dimers and trimers of the original fatty acid. For various methods of preparing these polymerized acids, see Ind. Eng. Chem. 32, 802, ibid. 33, 86 and ibid. 32, 694 and 963; J. Am. Oil Chemists' Soc. 24, 65. A typical "dimer" acid is obtained by the dimerization of linoleic acid from soy, cottonseed, corn and linseed acids. Representative specifications are (Emery 955 Dimer Acid):

| | |
|---|---|
| Iodine value | 80–95. |
| Acid value | 180–192. |
| Sap. value | 185–195. |
| Unsaps | 2.0% max. |
| Neutralization equiv | 290–310. |
| Molecular weight | 600 approx. |
| Dimer content | 85% approx. |
| Trimer content | 12% approx. |
| Viscosity at 25° C. (Gardner-Holdt) | Z–4. |

Of course, the relative dimer-trimer ratio can vary over a broad range. In any event, the polybasic fatty acid and polymer will have a carbon atom content as above defined.

The amount of polybasic fatty acid polymer used in forming the invert emulsions will be dependent upon a number of factors. For example, as the amount of water or weight material is increased, it is usually desired to increase the amount of polymer employed. In general the optimum amount to be used can be easily determined by mere routine tests in the field. Generally, a polybasic fatty acid polymer concentration of at least 2.5 and in the range of 2.5 to 30 pounds per barrel, preferably 10 to 20 pounds per barrel of finished unweighted emulsion can be used. These ranges are suitable for both relatively pure polymers and those in admixture with other ingredients or diluents as described above, that is where the polymer exceeds 30%. For relatively pure polymers, the amount used can be chosen from the lower portion of the range. As the polymer content decreases (e.g. towards 30%), amounts used can be increased toward the upper part of the range. Even if the polymer content of the material falls below 30%, increased amounts of the material exceeding the limits of the above broad range can be used to compensate for dilution. For the vegetable pitches and linseed pitches described above, the 10 to 20 pounds per barrel range is especially preferred. With these considerations in mind and also that amounts of polybasic fatty acid polymer per se above 20 or 30 pounds per barrel can be used, the above ranges will be construed to cover both polymers per se and diluted polymers above 30% by volume concentration and when the dilution exceeds 70%, the excess diluent will be subtracted to determine the polybasic fatty acid polymer concentration. The lower limit of polymer concentration to be used in any given instance will be determined by the stability, viscosity and, in part, the fluid loss desired in the finished emulsion. Of course, it will be understood that as the emulsion is weighted, its fluid volume per barrel decreases so that this is to be taken into account. The upper limit is dictated primarilmy by economics, since adding additional amounts of polymer after an optimum is reached does not seem to harm the emulsion.

As indicated above, the polybasic fatty acid polymers are in themselves frequently found to be satisfactory invert emulsion stabilizers although such emulsions usually have lower stability and higher fluid losses than do the preferred emulsions of this invention. Nevertheless, such emulsions are useful even without any undissolved clay or weight solids being present. Their properties are frequently improved by the addition of fine clay or weighting material solids and still further by converting the acid polymers to soaps as explained below.

POLYAMINES AND POLYAMINO ALCOHOLS

As stated above, the combination of selected ones of these polyamines or polyamino alcohols with the polybasic fatty acid polymer produces invert emulsions which are not only of increased stability, particularly toward clay solids and weight materials, but which also have minimum fluid losses and are of controllable viscosity and gel strength. The exact mechanism by which these compounds act to improve the properties of the emulsions is not known.

The suitable amine compounds can be represented by the formula

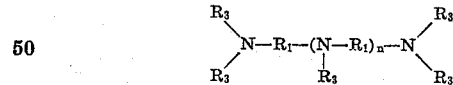

(I)

wherein $R_1$ is an alkylene group (either straight, branched, saturated or unsaturated) having 2 to 6 carbon atoms per group, $n$ is a whole number of 0 to 5 and $R_3$ is selected from the class consisting of hydrogen and $-(RO)_mH$ groups, RO being selected from the class consisting of ethylene oxide, propylene oxide, butylene oxide and admixtures thereof and $m$ being a whole number of at least one but less than five and preferably is one. It is to be noted that when two or more $R_1$'s are selected for a particular compound, they need not be alike, e.g. one $R_1$ can be an ethylene group, another a propylene group, etc. Similarly the $R_3$'s need not all be the same; one can be hydrogen, another ethylene oxide, another butylene oxide, etc.

Of the amino alcohols represented by Formula I, those represented by Formula II below are preferred:

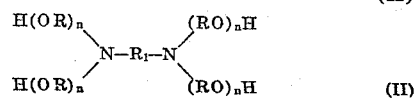

(II)

wherein RO (or OR) is selected from the group consisting of ethylene oxide, propylene oxide, butylene oxide and admixtures thereof; $n$ is a whole number of at least one, the sum of all $n$'s preferably being less than 17, most preferably less than 7; and $R_1$ is an alkylene group (either straight, branched, saturated or unsaturated) having from 2 to 6 carbon atoms. Exemplary of the compounds represented by Formula I are ethylene diamine, propylene diamine, butylene diamine, hexylene diamine, heptylene diamine, tetraethylene pentamine, diethylene triamine, triethylene tetramine, tetrabutylene pentamine, dihexylene triamine, triheptylene tetramine, tetraheptylene pentamine, etc., and the alcohols thereof such as N,N,N',N'-tetrakis-(hydroxyethyl) ethylenediamine, dihydroxyethyl ethylenediamine, dihydroxypropyl ethylenediamine, monohydroxyethyl trihydroxypropyl ethylenediamine, N,N,N',N'-tetrakis(2-hydroxypropyl) ethylenediamine, dihydroxyethyl dihydroxypropyl ethylenediamine, dihydroxyethyl dihydroxybutyl ethylenediamine, trihydroxyethyl monohydroxypropyl ethylenediamine, dihydroxyethyloxyethyl dihydroxyethyl ethylenediamine, N,N,N',N' - tetrakis(hydroxybutyl) ethylenediamine, trihydroxybutyl monohydroxyethyl ethylenediamine, dihydroxyethyloxyethyl dihydroxypropyl ethylenediamine, monohydroxybutl trihydroxyethyl ethylenediamine, monohydroxypropyloxyethyl monohydroxyethyloxypropyl dihydroxpropyl ethylenediamine, monohydroxypropyl monohydroxyethyloxypropyl trihydroxyethyl ethylenediamine, pentahydroxyethyl diethylenetriamine, hexahydroxyethyl triethylenetetramine, heptahydroxyethyl tetraethylenepentamine, pentahydroxypropyl diethylenetriamine, hexahydroxypropyl triethylenetetramine, heptahydroxypropyl tetraethylenepentamine, trihydroxyethyl trihydroxybutyl triethylenetetramine, monohydroxyethyl dihydroxypropyl diethlenetriamine, trihydroxypropyl tetraethylenepentamine, and other RO combinations, and the corresponding propylene-, butylene-, pentylene-, hexylene- and heptylene-polyamine compounds such as dihydroxyethyl propylenediamine, dihydroxypropyl propylenediamine, tetrahydroxybutyl tripropylenetetramine, hexahydroxypropyl trihexylenetetramine, trihydroxyethyl monohydroxypropyl pentylenediamine, etc. Preferred ones of these compounds are ethylene diamine, and the alcohols sold under the names of Quadrol, OX–432(N,N,N',N' - tetrakis(hydroxyethyl) ethylenediamine), as well as the monohydroxyethyltrihydroxypropylethylenediamine (referred to herein as MTE). Each of these produce satisfactory invert emulsion properties in either fresh water or saturated salt water systems, as well as when the emulsion is contaminated with ordinary well fluid contaminants.

It will thus be seen that the polyamino alcohols are really an alkylene polyamine having two to seven amino nitrogens and 2 to 36 carbon atoms per molecule which has been adducted with ethylene, propylene or butylene oxides, or mixtures thereof, in an amount within the range of one mol of oxide per mol of polyamine to five mols of oxide per amino nitrogen atom. The type of alkylene chain configuration or its length does not seem to affect the action of the polyamino alcohol except that only if the alkylene chain contains an excessive number of carbon atoms or other hydrophobic groups, the water solubility of the final product may be decreased to a point where it is rendered less efficient. In some cases, this can be at least partially compensated for by using additional amounts of the alkylene oxide to impart additional water solubility to the compound. In this connection, it should be noted that the amount of the alkylene oxide adducted with the alkylene polyamine can exceed the upper limits of the ranges set out above thereof without rendering the amino alcohol adducts completely ineffective for the purposes of this invention.

There does not seem to be any substantial difference between the polyamino alcohols which are formed by adducting only with butylene oxide, propylene oxide or ethylene oxide (where the adduct is from only one type of oxide it will be referred to as a simple adduct). These simple adducts act to stabilize the invert emulsion and each imparts a reasonably good solids tolerance to the emulsion. However, when the (OR) groups in Formulae I and II are of different kinds (herein referred to as mixed adducts), the mixed adduct usually imparts a somewhat larger solids or clay tolerance to the emulsion than does a simple adduct. For example, MTE which is a mixed adduct of ethylene diamine with both propylene and ethylene oxides, causes an emulsion to have a greater clay tolerance than does either Quadrol or OX–432 which are simple adducts of only propylene oxide and of only ethylene oxide, respectively. The exact reason for this marked difference is not known. Further, in many cases, the mixed adducts will impart greater gel strengths and higher viscosities than will the simple adducts. Thus the mixed adducts are the preferred ones of the alcohols as the co-emulsifier per se but they can be used with the other polyamino alcohols as solids tolerance or thixotropic control agents where such other alcohols do not possess these properties to the desired degree.

The amount of the co-emulsifier polyamine or polyamino alcohol to be used does not appear to be critical so long as a certain minimum is present. While such minimum will vary with each type of compound and with the desired properties of the emulsions, it can generally be stated as 0.5 pound per barrel. The maximum amount of the co-emulsifier polyamine or polyamino alcohol to be used will depend upon economic considerations and increasing the amount above about 2 pounds per barrel does not seem to markedly improve the properties of the emulsion. Thus a range can be stated 0.5 to 5 pounds per barrel and preferably about one pound per barrel is employed.

As indicated above, some of the emulsions prepared with the polyamino alcohols of this invention do not exhibit appreciable gel strength and the viscosity may be in a medium to low range such as from 30 to 60 centipoises. It has been found that certain diamino alcohols, as well as certain derivatives thereof, will often produce a marked increase in viscosity and gel strength, particularly in the 10 minute gal strength, of the invert emulsion muds of this invention. Among such rheological control compounds are the mixed diamino adducts corresponding to Formula II above. A particularly excellent compound within such definition is monohydroxyethyltrihydroxypropylethylenediamine. Other rheological control compounds include the monoesters and diesters of the diamino alcohols of Formula II and tall oil, such as the monoester of N,N,N',N'-tetrakis(2-hydroxypropyl) ethylenediamine with tall oil; such diamino alcohol-tall oil mono- and di-esters adducted with an additional 100% to 400% of their own weight of ethylene, propylene or butylene oxides, or mixtures thereof, and mixtures of these various compounds. Of these rheological control compounds, those which are mixed adducts falling within the definition of Formula II give desired over-all properties to the invert emulsions when used in the absence of any other nitrogen-containing alcohol. As to the other rheological control compounds, many of them such as the monoester of N,N,N',N'-tetrakis(2-hydroxypropyl) ethylenediamine with tall oil, and such monoester adducted with 200% of its own weight of additional ethylene oxide, do not appear to give as much fluid loss reduction or stability as do the polyamino alcohols per se. Accordingly, these other rheological control compounds can be used as treating agents and in combinations with other polyamino alcohols to increase the viscosity and gel strength of the invert emulsions.

It is to be noted that the increase in gel strength and viscosity caused by these rheological control compounds is most pronounced in the absence of clay solids in the emulsion.

The exact amounts of these rheological control compounds which should be used in combination with the other polyamino alcohols should be sufficient to give the desired increase in gel strength and viscosity and will depend upon various conditions such as clay solids concentration in the emulsion. Generally amounts in the range of 0.25 to 3 pounds per barrel will give the desired thixotropic and viscosity properties. When a polyamino alcohol is used in the dual role of a co-emulsifier and a rheological control agent, the amount thereof can be within the range set forth for the co-emulsifier above.

SALTS AND BASES

As indicated above, it has been found that improved results are obtained when the polybasic fatty acid polymer is employed in combination with an ingredient which is capable of reacting with the polymer to form a soap. Such ingredient can be added to the polymer prior to its addition to the emulsion and the resulting mixture itself added to the emulsion. However, it is preferred that the polymer and the ingredient be separately added to the emulsion to permit soap formation in situ therein.

The ingredient for forming the soap can be any compound capable of supplying a metallic cation for the soap-forming reaction. Alkali metal bases (sodium, potassium and lithium oxides, hydroxides and carbonates) can be the sole ingredient used with the polymer to provide emulsions having properties suitable for some well operations where very high stability and low fluid loss are not required. The properties of the emulsion can be further improved by employing such alkali metal base in combination with a polyvalent metal ionizable, water-soluble salt or base. The preferred polyvalent compounds are the alkaline earth metal oxides, hydroxides (bases) and salts (calcium, barium, strontium and magnesium oxides, hydroxides, chlorides, bromides, sulfates, etc.), the more water soluble of these being preferred. On the other hand, the alkali metal base can be omitted and the polyvalent metal salt or base, e.g. an alkaline earth salt or base, used alone although the properties of the emulsion will not be as good as when the alkali metal base is also used. An exception to this last statement exists when the alkaline earth metal bases are used; for example, lime used alone gives an excellent emulsion.

Therefore, the most superior emulsions are obtained when the aqueous phase is basic (pH above 7 and preferably above 9 for the greatest stability and lowest fluid loss) and an alkaline earth metal cation supplying compound is added. The basicity can be achieved in any desired manner as indicated above.

Of the alkaline earth metal compounds, the calcium compounds are preferred because they give maximum tolerance toward clay solids and lower fluid losses over a wider variety of conditions. The calcium can be supplied as a water-soluble salt (e.g. calcium chloride) when an alkali metal base or other compound is employed to give a basic medium or as a base (e.g. lime) which in itself gives both basicity and the calcium ion. The calcium base can also be used in combination with any of the other alkali metal bases or cation supplying ingredients to provide a variety of effects.

Tri- or higher valency cation supplying ingredients can also be employed, either alone or, more preferably, in combination with the alkali metal base and/or the alkaline earth metal materials. For example, aluminum, ferric, etc. salts or bases can be employed.

The various polyvalent cation supplying ingredients have different effects on the emulsion. For example, magnesium compounds tend to give the emulsion greater heat stability but considerably less tolerance toward clay solids although even so, the clay solid resistance is still high enough to permit use of the emulsions. The magnesium type emulsions also tend to be of greater viscosity and gel strength than the calcium type emulsions.

Aluminum compounds, such as alum, when used alone, are also inferior to the calcium compounds because of higher fluid losses. However, when the aluminum compounds are used in combination with a base, such as the alkali metal base and particularly when a calcium salt is also present, there is a fluid loss reduction compared to the same emulsion when the aluminum compounds are absent. Thus the aluminum compounds, such as the ionizable water-soluble salts thereof, can be used as fluid loss control agents in an invert emulsion stabilized with the co-emulsifiers of this invention and particularly in one which is basic in nature. Clay solids need not be present for this effect to be achieved.

An ionizable water-soluble barium compound and a water-soluble aluminum compound can be added for reaction in situ in the emulsion to form a water-soluble aluminum compound and a water-insoluble barium compound. For example, barium chloride and alum can be added to form aluminum chloride and barium sulfate. Such a combination gives very high clay tolerance to the emulsion but unfortunately, the fluid loss also tends to be higher than is frequently desired.

From the foregoing, it will be seen that the metallic cation-supplying ingredient can be described as any compound having as ionizable metallic element capable of reacting with the polybasic fatty acid polymer to form a soap, such metallic element being mono- or polyvalent and forming a part of either an inorganic or an organic compound.

The preferred base is caustic and the preferred salt is calcium chloride. In most cases the addition of this base alone to the emulsion containing the co-emulsifiers will cause a considerable reduction in viscosity and gel strength. There also results a similar reduction in fluid loss but this is not so pronounced. Then, upon further addition of the salt, there is a considerable increase in stability and reduction in fluid loss and usually the gels and viscosity do not markedly change.

The amount of the alkali metal base to be used should be sufficient to render the aqueous phase of the emulsion basic. At least 1 pound per barrel is usually required and amounts in the range of 1 to 10 pounds per barrel are operative although an amount in the range of 2 to 5 pounds per barrel is generally preferred. When an alkaline earth metal base is used instead of the alkali metal base, the same ranges apply although usually amounts in the upper parts of these ranges will be preferred. Mixtures of the bases with the total amount being within these ranges can also be used. With some of the emulsions of this invention, best results will be obtained with about 3 pounds per barrel of base while with others, about 5 pounds per barrel of base is best. The exact amount to obtain the optimum results can be easily obtained in any particular instance by mere routine test.

As for the polyvalent metal compound supplied for reaction with the polymer to form a soap, the amount should be at least 3 pounds per barrel and generally in the range of 3 to 15, preferably 5 to 10, pounds per barrel with concentrations in the upper part of the range tending to give more stable emulsions and lower fluid losses. The alkaline earth metal base when used alone in the dual role of base and polyvalent metal compound can have its concentration chosen from any of the concentration ranges for the base and the polyvalent metal compound given above. However, it is preferred to use smaller amounts of the alkaline earth metal base within the range for the base given above and supplement it with another non-basic polyvalent metal compound used within the range given for the polyvalent metal compounds.

As indicated above, emulsions containing saturated salt water as the disperse phase seem, in many instances, to be superior (e.g. exhibit lower fluid losses) to those wherein fresh water is the disperse phase. Conversely, the salt water emulsions sometimes exhibit lower stability than do the fresh water emulsions. In those instances where very low fluid losses are desired, it is possible to add varying amounts of salt, that is, water-soluble alkali metal salts (particularly sodium chloride) to the water phase in addition to the salts mentioned above. The amount of such alkali metal salts can vary from small quantities on up to substantially saturation of the water phase. In this connection, as mentioned above, sea water can be used.

DRY CONCENTRATE

As mentioned above, a dry concentrate can be prepared to form the emulsions of this invention. In addition to the ingredients discussed above, expanded perlite is preferably used to act as a carrier for the acid polymers. It has been found that the acid polymers can be adsorbed on the perlite and yet the polymers are given up or extracted by the oil phase of the invert emulsion much more readily than when adsorbed on clay. Apparently, the adsorptive power of the clay is too great so that it tends to hold the polymers thereon and prevent dissolution in the oil. On the other hand, when all perlite is employed, it is necessary to use rather large concentrations thereof in order to obtain a dry mixture. At such concentrations, the resulting concentrate has an exceptional low density, thereby making it costly to ship and store. Thus, it is preferred that at least sufficient perlite be used to adequately disperse the acid polymers thereon and the balance of the carrier be the clay. Preferably a concentration of perlite within the range of 3 to 15 pounds per barrel and a perlite to clay weight ratio within the range of 5:1 to 1:3 will be employed.

The perlite employed is a standard article of commerce sometimes known as "expanded perlite." It is manufactured by heat treating the volcanic glass known as perlite mineral to cause expansion of the same. Preferably, the perlite used in this invention is the fines recovered from the heat popping process.

As to the type of clay selected, it should have sufficient adsorptive power to permit, with reasonable minimum concentrations of clay, adsorption on the clay of the liquid ingredients of formula (aside from the acid polymer) as well as any moisture collecting in the concentrate from the atmosphere. Generally, the operable clays or minerals are those which have sufficient adsorptive powers to yield a dry, free-flowing concentrate when a reasonable amount of the clay or mineral is employed (at least 10 pounds per barrel and preferably 10 to 25 pounds per barrel of emulsion when a predetermined weight of concentrate containing at least 10 pounds of clay is added to the emulsion) and which clay or mineral results in a concentrate capable of imparting satisfactory mud properties to the water-in-oil emulsion mud. In any event, the evaluation of each individual clay with any given group of ingredients is a matter of mere routine test to one skilled in the art once the concept of this invention is known.

One clay which has been found to be particularly suitable presently bears the trademark "X–811" and is Angelina County filter clay. It is found in pits in Angelina County, Texas, such as those approximately 8 miles south of Zavalla, Texas, and then one and one-half miles west of U.S. Highway 69. Such pits are on the G. W. Norton estate and J. C. Everet survey and they are so identified on the official survey plats. This clay is characterized by a very low yield (substantially non-hydratable) and has considerable adsorptive power. It has been found to result in a dry free-flowing concentrate with a minimum amount of clay present.

Another clay which has been found to be satisfactory, though to a lesser extent than Angelina County filter clay, is an adsorptive clay comprising predominantly calcium montmorillonite (sold under the trademark "Xact") and found for example in Angelina County, Texas on the W. C. Stanley survey, approximately 7 miles due south of Zavalla, Texas. It is classed as a drilling fluid clay and one having a higher yield and lower adsorptive power than Angelina County filter clay. Bentonite is also operable to produce the dry free-flowing concentrate but being highly hydratable, it is not as preferred because it tends to lessen the stability of the emulsion. Other clays which have been found to be satisfactory in many instances are those which are sold under the name Baroco and the trademark "High Yield." Each of these clays is a relatively low yield clay, such as calcium montmorillonite, which by suitable treatment has been upgraded to increase its yield. Also found to be satisfactory is the clay sold under the name "Attasorb." This clay is an ultrafine (90–95 percent by weight finer than ten microns) sorptive calcined attapulgite (a fuller's earth) described chemically as a complex hydrated magnesium aluminum silicate.

It is to be pointed out that the use of the perlite and clay is not essential in forming the emulsions of this invention and that well fluids having desirable properties can be used without the addition, either directly or indirectly, of any insoluble solids thereto. For example, in some instances, the emulsion fluids of this invention may find use in work-over operations where the addition of solids is undesired to avoid blocking of the formations. Of course, when the emulsions are used in the drilling and completion of wells, they will inherently have solids therein by reason of the drilling action.

Example 1

A series of emulsion samples were prepared by mixing with diesel oil, 15 lb./bbl. of vegetable pitch 250, 1 lb./bbl. of the alcohol diamine co-emulsifier indicated in Table I and varying amounts of caustic and calcium chloride also as indicated in Table I. The oil mixture was then mixed with fresh water or saturated salt (NaCl) water in a 50–50 volume ratio. The mixture was then stirred for 25 minutes at 110 volts on a Hamilton Beach mixer and allowed to age overnight. The properties reported in Table I were then run after again mixing on the Hamilton Beach mixer.

TABLE I
QUADROL (N,N,N',N'-TETRAKIS(2-HYDROXYPROPYL)ETHYLENEDIAMINE)

| lb./bbl. NaOH | lb./bbl. CaCl$_2$ | Water | Stab., Volts | Plastic Viscosity, cps. | Gels. 0/10 min. | Fluid Loss |
|---|---|---|---|---|---|---|
| 0 | 0 | TW | 150 | 155 | 4/3 | 6.6 |
| 0 | 0 | SSW | 500 | 155 | 2/4 | 8.3 |
| 1 | 0 | SSW | 700 | 55 | 0/2 | 4.8 |
| 3 | 0 | SSW | 750 | 55 | 0/2 | 4.1 |
| 5 | 0 | SSW | 450 | 53 | 0/2 | 2.4 |
| 1 | 5 | TW | 1,100+ | 110 | 0/2 | 0.9 |
| 1 | 10 | TW | 1,100+ | 100 | 0/2 | 1.2 |
| 3 | 10 | TW | 1,100+ | 135 | 0/4 | 0.2 |
| 5 | 10 | TW | 1,100+ | 110 | 0/3 | 1.1 |
| 1 | 5 | SSW | 1,100+ | 130 | 0/4 | 1.2 |
| 3 | 5 | SSW | 750 | 130 | 1/7 | 0.6 |
| 5 | 5 | SSW | 210 | 100 | 0/3 | 0.4 |
| 1 | 10 | SSW | 1,100+ | 145 | 1/9 | 0.3 |
| 3 | 10 | SSW | 1,100+ | 125 | 0/3 | 0.0 |
| 5 | 10 | SSW | 1,000 | 103 | 1/7 | 0.4 |

OX-432(N,N,N',N'-TETRAKIS(HYDROXYETHYL)ETHYLENEDIAMINE)

| lb./bbl. NaOH | lb./bbl. CaCl$_2$ | Water | Stab., Volts | Plastic Viscosity, cps. | Gels. 0/10 min. | Fluid Loss |
|---|---|---|---|---|---|---|
| 0 | 0 | TW | 195 | 140 | 7/4 | 6.8 |
| 0 | 0 | SSW | 450 | 180 | 4/4 | 5.8 |
| 1 | 0 | SSW | 500 | 70 | 0/3 | 4.2 |
| 3 | 0 | SSW | 600 | 53 | 0/1 | 2.8 |
| 5 | 0 | SSW | 500 | 50 | 0/2 | 1.9 |
| 1 | 5 | TW | 1,100+ | 45 | 0/2 | 0.1 |
| 3 | 5 | TW | 900 | 45 | 0/2 | 0.0 |
| 5 | 5 | TW | 1,100+ | 115 | 0/2 | 0.4 |
| 1 | 10 | TW | 950 | 45 | 0/1 | 0.0 |
| 3 | 10 | TW | 1,100+ | 100 | 0/2 | 0.3 |
| 5 | 10 | TW | 1,100+ | 75 | 0/1 | 0.4 |
| 1 | 5 | SSW | 450 | 48 | 0/1 | 1.0 |
| 3 | 5 | SSW | 210 | 53 | 0/1 | 0.9 |
| 5 | 5 | SSW | 210 | 48 | 0/1 | 1.1 |
| 1 | 10 | SSW | 750 | 50 | 0/1 | 1.2 |
| 3 | 10 | SSW | 500 | 58 | 0/1 | 0.7 |
| 5 | 10 | SSW | 600 | 38 | 0/1 | 0.8 |

TABLE I—Continued

MTE (MONOHYDROXYLETHYLTRIHYDROXYPROPYLETHYLENEDIAMINE)

| lb./bbl. NaOH | lb./bbl. CaCl$_2$ | Water | Stab., Volts | Plastic Viscosity, cps. | Gels. 0/10 min. | Fluid Loss |
|---|---|---|---|---|---|---|
| 1 | 5 | TW | 700 | 90 | 0/12 | 1.8 |
| 3 | 5 | TW | 1,100+ | 115 | 0/35 | 2.0 |
| 5 | 5 | TW | 240 | 115 | 0/45 | 1.9 |
| 1 | 10 | TW | 700 | 110 | 0/30 | 2.4 |
| 3 | 10 | TW | 850 | 105 | 0/25 | 1.8 |
| 5 | 10 | TW | 1,100+ | 115 | 0/45 | 1.9 |
| 1 | 5 | SSW | 1,100+ | 100 | 0/10 | 1.4 |
| 3 | 5 | SSW | 1,100+ | 115 | 0/65 | 1.9 |
| 5 | 5 | SSW | 240 | 120 | 0/35 | 1.2 |
| 1 | 10 | SSW | 750 | 110 | 0/30 | 1.7 |
| 5 | 10 | SSW | 1,100+ | 140 | 0/90 | 1.2 |

BLANK (NO EMULSIFIER)

| 1 | 5 | TW | 1,100+ | 100 | 2/4 | 5.8 |
|---|---|---|---|---|---|---|
| 3 | 5 | TW | 1,100+ | 120 | 2/5 | 4.9 |
| 5 | 5 | TW | 450 | 95 | 2/8 | 4.8 |
| 1 | 10 | TW | 950 | 90 | 1/4 | 2.3 |
| 3 | 10 | TW | 900 | 110 | 2/10 | 2.2 |
| 5 | 10 | TW | 650 | 75 | 2/7 | 4.0 |
| 1 | 5 | SSW | 450 | 80 | 2/6 | 2.9 |
| 3 | 5 | SSW | 450 | 80 | 2/6 | 3.3 |
| 5 | 5 | SSW | 300 | 75 | 2/4 | 5.8 |

It will be noted that the above data indicates:

(1) All of the emulsifiers, except OX-432, were better for fluid loss control in the saturated salt water systems than in the fresh water systems.

(2) The lowest values of fluid loss were obtained in the presence of both calcium salt and the base. In the absence of such salt, the fluid losses usually were higher. Also, the addition of the calcium salt usually resulted in higher stabilities although there are several exceptions to this.

(3) The addition of caustic (NaOH) alone to the emulsions resulted in a significant decrease in viscosity and gel strengths. The further addition of the calcium salt frequently increased the viscosity and gel strengths somewhat.

(4) Fluid loss control was achieved even in the absence of solids. In this connection, it was noted that an invert emulsion was formed in every instance reported in Table I, even in the case where pitch only was used as an emulsifier.

*Example II*

A dry concentrate was prepared in the following manner:

(1) 15 lbs./bbl. of vegetable pitch 250 was smeared on 5 lbs./bbl. of perlite and then 15 lbs./bbl. of X-811 clay was added.

(2) To the mixture of item 1, 1.0 lb./bbl. of Quadrol was added.

(3) Thereafter 3.0 lb./bbl. of caustic and 10 lbs./bbl. of CaCl$_2$ were added.

An emulsion was then prepared by adding 49 lbs./bbl. of the dry concentrate to diesel oil followed by addition of water to yield an emulsion containing 50 volume percent each of water and oil. Bentonite was added to the resulting invert emulsion in 20 lb./bbl. increments until the emulsion flipped to an oil-in-water type. The emulsion was satisfactory at 80 lb./bbl. of bentonite but the addition of the next 20 lb. increment caused it to "flip." The fluid loss remained below 1 cc. until the emulsion "flipped."

*Example III*

A series of emulsions were made from the dry concentrate of Example II. Each emulsion contained:

40 lb./bbl. dry concentrate
40 vol. percent diesel oil
60 vol. percent saturated salt water Again bentonite was added in increments with the results shown in Table III:

TABLE III

| Sample No. | Lb./bbl. Bentonite | Stab. | Visc. | Gels | Fl. Loss |
|---|---|---|---|---|---|
| 1 | 0 | 600 | 225 | 2/25 | 0.4 |
| 2 | 40 | 165 | 175 | 1/8 | 0.4 |
| 3 | 60 | 120 | 200 | 1/7 | 0.2 |
| 4 | 80 | 0 | | | |

The above samples were aged for approximately 48 hours at room temperature, remixed and their properties again measured:

| Sample No. | Lb./bbl. Bentonite | Stab. | Visc. | Gels | Fl. Loss |
|---|---|---|---|---|---|
| 1 | | 140 | 375 | 30/40 | 0.8 |
| 2 | | 180 | 185 | 1/2 | 0.2 |
| 3 | | 120 | 170 | 1/2 | 0.4 |

The sample compositions are identified in Example VII.

In this data it is significant to note that the bentonite does not thicken the invert emulsion as it does with other types of invert emulsions. In fact, the bentonite seems to have a thinning action and in any event, it does not greatly change the thixotropic properties of the emulsion as increasing quantities of bentonite are added.

*Example IV*

To demonstrate the superior solids tolerance of an emulsion in which a mixed adduct is used, the following dry mix was made:

| | Parts by weight |
|---|---|
| Vegetable pitch 250 | 15 |
| MTE [1] | 1 |
| CaCl$_2$ | 10 |
| NaOH | 3 |
| X-811 | 15 |
| Perlite | 5 |

[1] Monohydroxyethyltrihydroxypropylethylenediamine. 50 lbs./bbl. of this mixture was mixed with diesel oil followed by enough fresh water to make 50 volume percent, based on the total oil-water volume. Bentonite (finely ground) was then added in increments, each followed by vigorous agitation on a Waring Blendor. The results are shown in Table IV.

TABLE IV

| Bentonite, lbs./bbl. | Properties—24 hours aging | | | |
|---|---|---|---|---|
| | Stab. | Visc. | Gels | F.L. |
| Blank | 900 | 75 | 0/2 | 0.1 |
| 20 | 850 | 100 | 0/2 | 0.0 |
| 40 | 300 | 100 | 0/2 | 0.0 |
| 60 | 180 | 110 | 0/2 | 0.1 |
| 80 | 150 | 130 | 0/2 | 0.0 |
| 100 | 150 | 145 | 0/2 | 0.2 |
| 120 | 135 | 235 | 2/4 | 0.0 |

Comparing Table IV with Examples II and III, it will be seen that the emulsions containing the mixed adducts, such as MTE, have an unexpectedly greater solids tolerance than do emulsions containing only symmetrical adducts such as Quadrol.

Similar results were obtained with saturated salt water replacing the fresh water except that the viscosity did not exceed 105 cps. even at 120 lb./bbl.

Heating the emulsion containing 80 lb./bbl. of bentonite for 24 hours at 200° F. did not cause it to "flip." Its properties were:

| Stab. | Visc. | Gels. | F.L. |
|---|---|---|---|
| 180 | 120 | 0/1 | 0.5 |

Example V

An invert emulsion was made with equal parts by volume of fresh water and diesel oil stabilized by 15 lbs./bbl. of vegetable pitch 250, 1 of MTE and 10 of $CaCl_2$. About 120 lbs./bbl. of bentonite were required to reduce its stability to zero. However, the fluid loss, even of the blank, was higher than those reported in Table IV.

A similar emulsion was made except 9.6 lbs./bbl. of $BaCl_2$ and 7.8 lbs./bbl. of alum (equivalent, on an anhydrous basis, to 3.5 lbs./bbl. $AlCl_3$) were substituted for the $CaCl_2$. Here again the fluid loss was higher than is often desired (4.0 cc.—all emulsion) but about 200 lbs./bbl. of bentonite was required to reduce the stability to zero.

Another 50–50 emulsion containing only 15 lbs./bbl. of vegetable pitch 250 required nearly 60 lbs./bbl. of bentonite to decrease stability to zero. However, fluid loss again was higher than is ordinarily desired.

Example VI

Emulsions having the same composition as that in Example IV (fresh water) were weighted to 12 and 17 lbs./gal. with barite. The properties were:

| Emulsion | lb./gal. | Stab. | Visc. | Gels | F.L. |
|---|---|---|---|---|---|
| 1. Blank | 8.1 | 800 | 80 | 0/2 | 0.0 |
| 2. Blank plus barite | 12.0 | 500 | 125 | 0/4 | 0.0 |
| 3. Blank plus barite | 17.0 | 450 | 160 | | 0.0 |
| *(Above aged overnight)* | | | | | |
| 1 | 8.1 | 1,000 | 82 | 0/1 | 0.0 |
| 2 | 12.0 | 600 | 130 | 0/1 | 0.0 |
| 3 | 17.0 | 500 | 200 | 3/15 | 0.0 |
| *(Above heated)* | | | | | |
| 2. (200° F., 24 hrs.) | 12.0 | 450 | 155 | 0/1 | 0.6 |
| 2. (300° F., 24 hrs.) | 12.0 | 105 | 90 | 0/2 | 0.0 |
| 3. (200° F., 24 hrs.) | 17.0 | 180 | 250 | 1/9 | 0.5 |
| 3. (300° F., 24 hrs.) | 17.0 | 90 | | | |

Example VII

Certain surface active agents have the ability to impart gel strength, particularly 10 minute gel strength to certain of the invert emulsions of this invention. To demonstrate this, a base emulsion was made up by mixing 15 lbs./bbl. of vegetable pitch 250, 1 lb./bbl. Quadrol, 3 lbs./bbl. NaOH and 10 lbs./bbl. $CaCl_2$ in diesel oil. Sufficient fresh water was then added to comprise 50 volume percent of the liquid components. The resulting emulsion was then divided into five samples and various surface active agents added as follows:

Sample No. 1: Base emulsion only.
Sample No. 2: Base emulsion plus ½ lb./bbl. of N,N,N',N'-tetrakis (2-hydroxypropyl) ethylenediamine adducted with 4 mols ethylene oxide per mol of the diamine (Q-4E.O.).
Sample No. 3: Base emulsion plus ½ lb./bbl. of N,N,N',N'-tetrakis(2-hydroxypropyl) ethylenediamine esterified with tall oil to form a monoester (QTO).
Sample No. 4: Base emulsion plus ½ lb./bbl. of the tall oil ester of Sample No. 3 adducted with twice its weight of ethylene oxide (QTO–200%).
Sample No. 5: Base emulsion plus ½ lb./bbl. of monohydroxyethyltrihydroxypropylethylenediamine (MTE).

After aging for 72 hours at room temperature, the properties of the samples were as follows:

| Sample No. | Stability | Viscosity | Gels | Fluid Loss |
|---|---|---|---|---|
| 1 | 240 | 140 | 0/2 | 0.4 |
| 2 | 200 | 145 | 2/8 | 1.4 |
| 3 | 200 | 175 | 7/12 | 1.6 |
| 4 | 500 | 205 | 5/22 | 0.6 |
| 5 | 320 | 140 | 3/15 | 0.6 |

To each emulsion sample (except the blank) an additional ½ lb./bbl. of the respective surface active agent was added and the properties again determined:

| Sample No. | Stability | Viscosity | Gels | Fluid Loss |
|---|---|---|---|---|
| 2+½ lb./bbl. Q-4E. O. | 400 | 160 | 2/25 | 1.6 |
| 3+½ lb./bbl. QTO | 280 | 160 | 3/30 | 1.8 |
| 4+½ lb./bbl. QTO (200%) | 410 | 190 | 3/30 | 1.0 |
| 5+½ lb./bb. MTE | 320 | 135 | 2/15 | 2.0 |

Upon aging the samples containing the added amount of agents for 24 hours at room temperature, they had the following properties:

| Sample No. | Stability | Viscosity | Gels | Fluid Loss |
|---|---|---|---|---|
| 2 | 380 | 175 | 1/10 | 1.0 |
| 3 | 280 | 175 | 3/30 | 0.8 |
| 4 | 400 | 235 | 5/40 | 0.4 |
| 5 | 380 | 130 | 1/15 | 1.8 |

From this data, it will be seen that each of the surface active agents imparted substantial gel strengths to the base emulsion. The QTO–200% seemed to be most effective in this regard. Also aging of the emulsions seemed in many cases to improve their properties and this was probably because some time was required for an equilibrium to be reached at which the emulsions exhibited their best properties.

Example VIII

To further demonstrate the gel imparting characteristics of the added surface active agents of Example VII, a series of emulsions were made up using 1 lb./bbl. of these various agents as the co-emulsifier instead of the Quadrol. The emulsions were prepared in the same manner as were those in Example I. Their properties were as set out in Table VII.

TABLE VIII
Q-4E.O.

| lb./bbl. NaOH | lb./bbl. $CaCl_2$ | Water | Stab., Volts | Plastic Viscosity, cps. | Gels 0 10 min. | Fluid Loss |
|---|---|---|---|---|---|---|
| 1 | 5 | TW | 1,100+ | 130 | 2/25 | 4.3 |
| 3 | 5 | TW | 1,100+ | 145 | 2/25 | 3.5 |
| 5 | 5 | TW | 1,100 | 150 | 2/20 | 3.4 |
| 1 | 10 | TW | 1,100+ | 125 | 2/24 | 3.9 |
| 3 | 10 | TW | 1,100+ | 135 | 2/30 | 4.1 |
| 5 | 10 | TW | 1,100+ | 145 | 2/30 | 3.3 |
| 1 | 5 | SSW | 1,100+ | 150 | 2/30 | 3.9 |
| 3 | 5 | SSW | 1,100+ | 175 | 2/20 | 3.7 |
| 5 | 5 | SSW | 900 | 165 | 2/40 | 4.1 |
| 1 | 10 | SSW | 500 | 155 | 2/25 | 3.6 |
| 3 | 10 | SSW | 800 | 175 | 3/30 | 4.0 |
| 5 | 10 | SSW | 1,050 | 185 | 2/30 | 3.4 |

QTO

| 1 | 5 | TW | 1,000 | 105 | 2/10 | 5.5 |
|---|---|---|---|---|---|---|
| 3 | 5 | TW | 950 | 100 | 2/13 | 5.0 |
| 5 | 5 | TW | 500 | 100 | 2/17 | 2.9 |
| 1 | 10 | TW | 900 | 95 | 2/10 | 5.6 |
| 3 | 10 | TW | 1,050 | 105 | 2/15 | 5.7 |
| 5 | 10 | TW | 700 | 100 | 2/14 | 4.8 |
| 1 | 5 | SSW | 1,100 | 105 | 2/10 | 7.0 |
| 3 | 5 | SSW | 1,000 | 105 | 2/12 | 3.6 |
| 5 | 5 | SSW | 350 | 100 | 2/15 | 4.1 |
| 1 | 10 | SSW | 1,050 | 225 | 2/40 | 2.2 |
| 3 | 10 | SSW | 1,100 | 375 | 4/120 | 2.9 |
| 5 | 10 | SSW | 1,100+ | 375 | 4/130 | 0.6 |

QTO—200%

| 1 | 5 | TW | 330 | 350 | 4/40 | 2.8 |
|---|---|---|---|---|---|---|
| 3 | 5 | TW | 1,100+ | 500+ | 10/450 | 1.4 |
| 5 | 5 | TW | 210 | 500+ | 7/400 | 1.2 |
| 1 | 10 | TW | 500 | 250 | 2/35 | 3.6 |
| 3 | 10 | TW | 1,100+ | 500+ | 5/350 | 1.2 |
| 5 | 10 | TW | 1,000 | 500+ | 2/250 | 1.2 |
| 1 | 5 | SSW | 600 | 475 | 4/50 | 2.3 |
| 3 | 5 | SSW | 1,100 | 500+ | 7/350 | 2.4 |
| 5 | 5 | SSW | 400 | 155 | 2/20 | 4.2 |
| 1 | 10 | SSW | 1,100+ | 155 | 2/15 | 5.6 |
| 3 | 10 | SSW | 1,100+ | 160 | 2/15 | 5.2 |
| 5 | 10 | SSW | 1,000 | 160 | 2/12 | 4.0 |

By comparing Table VIII with the data for Quadrol and MTE in Table I, it will be noted that each of the Q-4E.O., QTO, QTO-200% and MTE yielded solids free emulsions having significantly higher gel strengths than emulsions prepared with Quadrol or OX-432. It is particularly significant that Q-4E.O., QTO and QTO-200% can be mixed with the Quadrol emulsions to give gel strength control without effecting the fluid loss control by the Quadrol.

*Example IX*

Fifty pounds per barrel of a concentrate comprising:

| | Parts by weight |
|---|---|
| Vegetable pitch 250 | 15 |
| MTE | 1 |
| $CaCl_2$ | 10 |
| NaOH | 3 |
| Perlite | 6 |
| X-811 clay | 16 | were used to stabilize a 50% oil-50% fresh water emulsion. Portions of the emulsion were then contaminated. The results are shown in Table IX.

TABLE IX

| Emulsion | Stab. | Visc. | Gels | F.L. |
|---|---|---|---|---|
| Blank | 500 | 57 | 0/0 | 0.4. |
| Blank+5 lb./bbl. cement | 550 | 65 | 1/2 | 0.6 (oil). |
| Blank+5 lb./bbl. anhydrite | 390 | 60 | 0/1 | 0.6 (oil.) |
| Blank+60 lb./bbl. NaCl | 30 | 50 | 0/0 | 0.0. |

From this it will be seen that the emulsion is stable even when highly contaminated. In this connection, the properties of the contaminated emulsions can be improved by adding additional concentrate or vegetable pitch.

*Example X*

Various emulsions were prepared in the same manner and with the same composition as the blank in Example IX except that of $MgCl_2$, $FeCl_3$ and $BaCl_2$ were substituted for the $CaCl_2$. The substitutions ranged from zero to 100% substitution. The results are shown in Table X.

TABLE X

| Pounds per Barrel | | | | Stab. | Visc. | Gels | F.L. |
|---|---|---|---|---|---|---|---|
| $CaCl_2$ | $MgCl_2$ | $FeCl_2$ | $BaCl_2$ | | | | |
| 10.0 | | | | 1,000 | 75 | 0/3 | 0.0 |
| 7.5 | 2.5 | | | 900 | 110 | 0/3 | 0.0 |
| 5.0 | 5.0 | | | 1,000 | 120 | 0/18 | 0.0 |
| 2.5 | 7.5 | | | 1,000 | 190 | 0/30 | ¹0.1 |
| | 10.0 | | | 550 | 125 | 0/20 | 0.0 |
| 7.5 | | 3.3 | | 500 | 105 | 0/6 | 0.0 |
| 5.0 | | 6.6 | | 1,200 | 235 | 1/22 | ¹1.0 |
| 2.5 | | 9.9 | | 450 | 150 | 0/2 | ¹0.6 |
| | | 13.2 | | 210 | 165 | 0/4 | ¹0.6 |
| 7.5 | | | 4.4 | 600 | 115 | 0/3 | ¹0.1 |
| 5.0 | | | 8.8 | 800 | 110 | 0/2 | 0.0 |
| 2.5 | | | 13.2 | 700 | 125 | 2/4 | ¹0.2 |
| | | | 17.6 | 400 | 135 | 5/15 | ¹0.6 |
| | 2.5 | 9.9 | | 210 | 200 | 1/10 | ¹1.0 |
| | 5.0 | 6.6 | | 800 | 230 | 1/12 | ¹1.6 |
| | 7.5 | 3.3 | | 600 | 180 | 0/10 | ¹0.6 |
| | 2.5 | | 13.2 | 500 | 150 | 2/8 | ¹0.4 |
| | 5.0 | | 8.8 | 600 | 155 | 0/6 | ¹0.7 |
| | 7.5 | | 4.4 | 800 | 155 | 0/6 | ¹0.7 |
| | | 9.9 | 4.4 | 600 | 200 | 0/10 | ¹2.0 |
| | | 6.6 | 8.8 | 1,000 | 235 | 0/10 | ¹1.4 |
| | | 3.3 | 13.2 | 900 | 205 | 0/10 | ¹0.2 |

¹ Indicates all oil.

None of the emulsions of Table X "flipped" or had zero stability upon heating for 24 hours at 200° F.

*Example XI*

Concentrates were made up with the following compositions:

| | Concentrate I | Concentrate II |
|---|---|---|
| Vegetable Pitch 250 | 15 | 15 |
| MTE | 1 | 1 |
| MgO | 2.8 | 2 |
| $MgCl_2$ | 8.7 | |
| NaOH | 1.5 | |
| Perlite | 6 | 6 |
| X-811 | 16 | 16 |
| NaCl | | 6 |
| | 51.0 | 46 |

Emulsions containing 50% diesel oil, 50% fresh water and 51 and 46 lbs./bbl. (of liquid) were made up and tested with the following results:

TABLE XI

| Emulsion | Stab. | Visc. | Gels | F.L. |
|---|---|---|---|---|
| 1. Blank (Concentrate I) | 600 | 155 | 2/20 | 0.2 |
| 2. Item 1+100 lb./bbl. bentonite | 0 | | | |
| 3. Item 2+3 lb./bbl. NaOH+5 lb./bbl. $CaCl_2$* | 700 | 205 | 0/10 | 0.2 |
| 4. Blank (Concentrate II) | 400 | 135 | 0/70 | 0.4 |
| 5. Item 4+120 lb./bbl. bentonite | 0 | | | |
| 6. Item 5+1 lb./bbl. alum+2 lb./bbl. NaOH | 100 | 230 | 0/5 | 0.4 |

*Neither the NaOH nor the $CaCl_2$ alone would give an invert emulsion.

From this data, it will be seen that the magnesium compounds can be used with added caustic, preferably also with alum or $CaCl_2$, to give emulsions having high solids tolerance.

*Example XII*

A dry mix comprising 15 parts vegetable pitch 250, 3 parts NaOH, 10 parts $CaCl_2$, 6 parts perlite and 16 parts X-811 clay was compounded. Fifty pounds per barrel of this mix and 1 pound per barrel of the agents designated in Table XII were added to a mixture of 50 percent each of fresh water and diesel oil followed by vigorous stirring. The various emulsions had the following properties:

TABLE XII

| | Stab. | Visc. | F.L. |
|---|---|---|---|
| Dihydroxyethyldihydroxypropylethylenediamine | 500 | 75 | 0.9 |
| Heptahydroxyethyltetraethylenepentamine | 500 | 65 | 0.1 |
| Pentahydroxyethyldiethylenetriamine | 500 | 65 | 0.3 |
| Hexahydroxyethyltriethylenetetramine | 500 | 60 | 0.0 |
| Dihydroxypropylethylenediamine | 500 | 80 | 8.4 |
| Pentahydroxypropyldiethylenetriamine | 500 | 80 | 0.2 |
| Hexahydroxypropyltriethylenetetramine | 500 | 85 | 0.0 |
| Heptahydroxypropyltetraethylenepentamine | 500 | 80 | 0.8 |
| Dihydroxypropylpropylenediamine | 500 | 80 | 0.2 |
| Dihydroxyethylpropylenediamine | 500 | 75 | 0.0 |
| Dihydroxyethyldihydroxybutylethylenediamine | 400 | 80 | 0.2 |
| Monohydroxyethyltrihydroxybutylethylenediamine | 600 | 90 | 0.8 |
| Dihydroxyethylethylenediamine | 400 | 60 | 0.2 |
| Ethylenediamine | 300 | 60 | 0.2 |

*Example XIII*

Emulsions having the following compositions were prepared:

| | Emulsion A | Emulsion B |
|---|---|---|
| Vegetable Pitch 250 lbs./bbl. | 15 | 15 |
| $CaCl_2$ lbs./bbl. | 10 | 10 |
| NaOH lbs./bbl. | 3 | 3 |
| Ethylenediamine lbs./bbl. | 1 | |
| Propylenediamine lbs./bbl. | | 1 |
| Fresh Water, diesel oil percent each | 50 | 50 |

Finely ground bentonite was then added in increments as indicated in Table XIII followed by vigorous stirring. The results were as follows:

TABLE XIII

EMULSION A

| Total Bentonite Added, Lbs./Bbl. | Stability | Viscosity | Fl. Loss |
|---|---|---|---|
| Blank | 700 | 80 | 0.8 |
| 20 | 270 | 80 | 0.6 |
| 40 | 210 | 110 | 0.6 |
| 60 | 195 | 145 | 0.7 |
| 80 | 180 | 185 | 0.4 |
| 100 | 165 | 230 | 0.8 |
| 120 | 135 | 235 | 0.5 |
| 140 | Flipped | | |

EMULSION B

| | Stability | Viscosity | Fl. Loss |
|---|---|---|---|
| Blank | 600 | 55 | 0.6 |
| 20 | 330 | 75 | 0.4 |
| 40 | 360 | 80 | 0.1 |
| 60 | 300 | 90 | 0.2 |
| 80 | 270 | 100 | 0.0 |
| 100 | 150 | 120 | 0.4 |
| 120 | Flipped | | |

It will thus be seen that these emulsions exhibited excellent solids tolerance.

All tests reported herein were run in accordance with API Recommended Practice 29, Third Edition, May 1950, except the stability tests. This measurement was made by means of a probe assembly carrying two silver strip electrodes spaced ⅛ inch apart. The A.C. voltage potential required to cause initial current flow between the electrodes is taken as a measure of the stability with higher voltages indicating more stable emulsions. Hence the stability figures are reported as "volts." All other figures are reported in conventional units.

From the foregoing it will be seen that this invention is one well adapted to attain all of the ends and objects hereinabove set forth, together with other advantages which are obvious and which are inherent to the composition and method.

It will be understood that certain features and subcombinations are of utility and may be employed without reference to other features and subcombinations. This is contemplated by and is within the scope of the claims.

The invention having been described, what is claimed is:

1. A well fluid comprising a water-in-oil emulsion stabilized with from 2.5 to 30 pounds per barrel of a polybasic fatty acid polymer resulting from the polymerization of unsaturated fatty acids having from 12 to 24 carbon atoms per molecule, from 1 to 10 pounds per barrel of a water-soluble alkaline earth metal salt and from 0.5 to 5 pounds per barrel of an amino compound selected from the group represented by the formula:

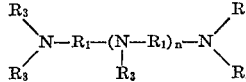

wherein the $R_1$'s are alkylene groups selected from those having 2 to 6 carbon atoms, $n$ is a whole number of 0 to 5 and the $R_3$'s are selected from the class consisting of hydrogen and $-(RO)_mH$ groups, RO being selected from the class consisting of ethylene oxide, propylene oxide, butylene oxide, and mixtures thereof and $m$ being a whole number of at least one but less than five.

2. The well fluid of claim 1 wherein said amino compound is tetrakis(hydroxypropyl) ethylenediamine.

3. The well fluid of claim 1 wherein said amino compound is tetrakis(hydroxyethyl) ethylenediamine.

4. The well fluid of claim 1 wherein said amino compound is monohydroxyethyltrihydroxypropylethylenediamine.

5. The well fluid of claim 1 wherein there is also present a treating compound selected from the group consisting of (a) an ester of a diamino alcohol corresponding to the formula of claim 1 wherein each $R_3$ is selected from the group consisting of ethylene oxide, propylene oxide, butylene oxide, and admixtures thereof, with tall oil, said ester being selected from the group consisting of monoesters and diesters; and (b) an ester of class (a) adducted with from 100 to 400 percent of its own weight of an alkylene oxide selected from the group consisting of ethylene oxide, propylene oxide and butylene oxide, and admixtures thereof; said treating compound being present in an amount sufficient to increase at least one of the viscosity and gel strength of the fluid.

6. A stable well fluid comprising a water-in-oil emulsion stabilized with from 2.5 to 30 pounds per barrel of vegetable oil fatty acid pitch, from 1 to 10 pounds per barrel of an alkali metal hydroxide, from 3 to 15 pounds per barrel of a water-soluble alkaline earth metal salt and from 0.5 to 5 pounds per barrel of monohydroxyethyltrihydroxypropylethylenediamine.

7. The well fluid of claim 6 in combination with a substantial amount of clay solids in the emulsion.

8. A stable well fluid comprising a water-in-oil emulsion stabilized with from 2.5 to 30 pounds per barrel of vegetable oil fatty acid pitch, from 3 to 15 pounds per barrel of a water-soluble alkaline earth metal salt and from 0.5 to 5 pounds per barrel of monohydroxyethyltrihydroxypropylethylenediamine.

9. The well fluid of claim 8 in combination with a sufficient amount of an alkali metal base to cause the pH of the emulsion to be above 7.

10. A well fluid comprising a water-in-oil emulsion stabilized with from 2.5 to 30 pounds per barrel of a metal soap of a polybasic fatty acid polymer resulting from the polymerization of unsaturated fatty acids having from 12 to 24 carbon atoms per molecule and from 0.5 to 5 pounds per barrel of an amino compound selected from the class consisting of an alkylene polyamine having from 2 to 7 amino nitrogen atoms and 2 to 36 carbon atoms, and said polyamine adducted with an alkylene oxide selected from the group consisting of ethylene oxide, propylene oxide, butylene oxide, and mixtures thereof in an amount in the range of one mol of oxide per mol of polyamine to five mols of oxide per amino nitrogen atom.

11. The well fluid of claim 10 in combination with from 1 to 10 pounds per barrel of a base selected from the group consisting of the alkali-metal and the alkaline earth metal bases.

12. The well fluid of claim 10 wherein the fluid has a pH of at least 7.

13. A well fluid comprising a water-in-oil emulsion stabilized with from 2.5 to 30 pounds per barrel of a polybasic fatty acid polymer resulting from the polymerization of unsaturated fatty acids having from 12 to 24 carbon atoms per molecule, from 3 to 15 pounds per barrel of an ionizable polyvalent metal compound and from 0.5 to 5 pounds per barrel of an alkylene diamine having from 2 to 6 carbon atoms and adducted with from 4 to 16 mols of an alkylene oxide selected from the group consisting of ethylene oxide, propylene oxide, butylene oxide, and mixtures thereof.

14. The well fluid of claim 13 wherein said polyvalent metal compound is an alkaline earth metal base.

15. The well fluid of claim 13 wherein said alkylene diamine is ethylene diamine and the number of mols of said alkylene oxide adducted therewith is 4.

16. The well fluid of claim 13 wherein said polyvalent metal compound is a mixture of an alkaline earth metal base and a water-soluble polyvalent metal salt, said base being present in an amount of at least 1 pound per barrel.

17. A well fluid comprising a water-in-oil emulsion stabilized with from 2.5 to 30 pounds per barrel of a polybasic fatty acid polymer resulting from the polymerization of unsaturated fatty acids having from 12 to 24 carbon atoms per molecule, from 1 to 10 pounds per barrel of an alkali metal base, from 3 to 15 pounds per barrel of a water-soluble polyvalent metal compound, and from 0.5 to 5 pounds per barrel of an alkylene diamine adducted with from 4 to 16 mols of an alkylene oxide, said diamine having from 2 to 6 carbon atoms and said alkylene oxide being selected from the group consisting of ethylene oxide, propylene oxide, butylene oxide and mixtures thereof.

18. The well fluid of claim 17 wherein said diamine is ethylene diamine and is adducted with 4 mols of a mixture of said alkylene oxides.

19. The well fluid of claim 17 wherein said ethylene diamine is adducted with 1 mol of ethylene oxide and 3 mols of propylene oxide.

20. The well fluid of claim 19 wherein said polyvalent metal is calcium.

21. A well fluid comprising a water-in-oil emulsion stabilized with from 2.5 to 30 pounds per barrel of a metal soap of a polybasic fatty acid polymer resulting from the polymerization of unsaturated fatty acids having from 12 to 24 carbon atoms per molecule and from 0.5 to 5 pounds per barrel of an alkylene diamine having from 2 to 6 carbon atoms.

22. The well fluid of claim 21 wherein said diamine is ethylene diamine.

23. In a method of drilling a well, the improvement which comprises circulating in the well a well drilling fluid comprising the composition of claim 1.

24. In a method of drilling a well, the improvement which comprises circulating in the well a well drilling fluid comprising the composition of claim 2.

25. In a method of drilling a well, the improvement which comprises circulating in the well a well drilling fluid comprising the composition of claim 4.

26. In a method of drilling a well, the improvement which comprises circulating in the well a well drilling fluid comprising the composition of claim 5.

References Cited in the file of this patent

UNITED STATES PATENTS

| | | |
|---|---|---|
| 2,149,527 | Kartaschoff | Mar. 7, 1939 |
| 2,509,588 | Dawson | May 30, 1950 |
| 2,552,775 | Fischer et al. | May 15, 1951 |
| 2,702,787 | Freeland | Feb. 22, 1955 |
| 2,793,188 | Swain et al. | May 21, 1957 |
| 2,793,996 | Lummus | May 28, 1957 |
| 2,797,196 | Dunn et al. | June 25, 1957 |
| 2,862,881 | Reddie | Dec. 2, 1958 |

OTHER REFERENCES

Synthetic Organic Chemicals, publ. by Carbide and Carbon Chemicals Co., 13th Ed., 1952, pages 86, 89, 91 and 92.